(12) United States Patent
Falcone

(10) Patent No.: US 6,235,689 B1
(45) Date of Patent: May 22, 2001

(54) POLYMERIC PERFLUORO POLYETHER PHOSPHATE LUBRICANT TOPCOAT

(75) Inventor: Samuel J. Falcone, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/166,167

(22) Filed: Oct. 5, 1998

Related U.S. Application Data

(62) Division of application No. 08/819,184, filed on Mar. 17, 1997, now Pat. No. 5,874,169.
(60) Provisional application No. 60/019,257, filed on Jun. 4, 1996.

(51) Int. Cl.[7] .................. C10M 107/48; C10M 107/38; C07F 9/08
(52) U.S. Cl. .................. 508/423; 508/431; 558/92; 558/165
(58) Field of Search .................. 508/423, 431; 558/92, 165

(56) References Cited

U.S. PATENT DOCUMENTS

| 3,083,224 | * | 3/1963 | Brace et al. . |
| 3,567,802 | * | 3/1971 | Garth . |
| 4,256,672 | * | 3/1981 | Yamamoto et al. . |
| 4,536,444 | | 8/1985 | Sumiya et al. . |
| 5,069,973 | | 12/1991 | Saito et al. . |
| 5,091,249 | | 2/1992 | Nishikawa et al. . |
| 5,112,662 | | 5/1992 | Ng . |
| 5,128,216 | | 7/1992 | Ng . |
| 5,132,446 | * | 7/1992 | Tohzuka et al. . |
| 5,141,661 | * | 8/1992 | De Rosa et al. . |
| 5,376,289 | * | 12/1994 | Montagna et al. . |
| 5,874,169 | * | 2/1999 | Falcone . |

FOREIGN PATENT DOCUMENTS

| 0 338 531 A2 | | 10/1989 | (EP) . |
| 0 338 531 | * | 10/1989 | (EP) . |
| 7-62377 | | 3/1995 | (JP) . |

* cited by examiner

*Primary Examiner*—Jerry D. Johnson
(74) *Attorney, Agent, or Firm*—McDermott, Will & Emery

(57) ABSTRACT

The degree of bonding of a perfluoro polyether lubricant topcoat to a magnetic recording medium is improved by forming a polymeric phosphate derivative thereof. In an embodiment of the present invention, a perfluoro polyether phosphate polymer is formed with a molecular weight of about 1000 to about 5000, and applied to a magnetic recording medium to achieve a bonded lube ratio in excess of 0.9.

7 Claims, 7 Drawing Sheets

POLYMERIC PERFLUORO POLYETHER PHOSPHATE LUBRICANT TOPCOAT

RELATED APPLICATION

This application claims priority from provisional patent application Ser. No. 60/019,257 filed Jun. 4, 1996, entitled "PERFLUORO POLYETHER PHOSPHATES AND POLYMERS THEREOF AS LUBRICANTS FOR THIN FILM MEDIA", and a divisional of application Ser. No. 08/819,184 filed Mar. 17, 1997, now U.S. Pat. No. 5,874,169.

TECHNICAL FIELD

The present invention relates to a magnetic recording medium, particularly a rotatable magnetic recording medium, such as a thin film magnetic disk and a lubricant topcoat for contact with a cooperating magnetic transducer head. The invention has particular applicability to a textured magnetic recording medium comprising a lubricant topcoat with a high bonded lube ratio.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorus (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. However, as employed herein, the expression "perfluoro polyether" encompasses groups which are not completely perfluorinated, such as where the terminal methylene groups attached to hydroxyl radicals contain no fluorine. The lubricant is usually dissolved in an organic solvent applied and bonded to the magnetic recording medium by techniques such as thermal treatment, ultraviolet (UV) irradiation and soaking. A significant factor in the performance of a lubricant topcoat is the bonded lube ratio which is the ratio of the amount of lubricant bonded directly to the magnetic recording medium to the amount of lubricant bonded to itself or to a mobile lubricant. Desirably, the bonded lube ratio should be high to realize a meaningful improvement in stiction and wear performance of the resulting magnetic recording medium.

In view of the criticality of the lubricant topcoat in magnetic recording media, there is a continuing need for improved uniform bonding of the lubricant topcoat to the magnetic recording medium, particularly to a protective carbon overcoat. There is also a need for improved lubricants for use as topcoats in the manufacture of magnetic recording media capable of achieving a high bonded lube ratio.

DISCLOSURE OF THE INVENTION

An object of the present invention is a magnetic recording medium comprising a lubricant topcoat bonded thereto at a high bonded lube ratio.

A further object of the present invention is a lubricant for use as a lubricant topcoat on a magnetic recording medium capable of bonding at a high bonded lube ratio.

Additional objects, advantages and other features of the invention will be set forth in part in the description which follows and in part will become apparent to those having ordinary skill in the art upon examination of the following disclosure or may be learned from the practice of the invention. The objects and advantages of the invention may be realized and obtained as particularly pointedut in the appended claims.

According to the present invention, the foregoing and other objects are achieved in part by a magnetic recording medium comprising a lubricant topcoat, said lubricant topcoat containing a perfluoro polyether phosphate polymer.

Another aspect of the present invention is a method of manufacturing a magnetic recording medium, which method comprises: forming a magnetic layer on a non-magnetic substrate; optionally forming a protective overcoat on the magnetic layer; and forming a lubricant topcoat on the magnetic layer, or on the protective overcoat, if present, said lubricant topcoat containing a perfluoro polyether phosphate polymer.

Additional objects and advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The present invention is directed to a class of lubricants which can be advantageously employed as lubricant topcoats on magnetic recording media with a high degree of bonding to the magnetic recording media, especially to a protective overcoat, such as a carbon-containing protective overcoat. A particularly advantageous characteristic of the inventive class of lubricants is its high affinity for carbon, as a result of which the lubricant forms a tightly adherent bond to carbon-containing protective overcoats. Consequently, the lubricant topcoat of the present invention desirably reduces stiction but increases wear resistance and durability.

In accordance with the present invention, a phosphate polymer can be formed from any of the various perfluoro polyether alcohol lubricants, such as those conventionally employed to form lubricant topcoats on magnetic recording media. In an embodiment of the present invention, a perfluoro polyether phosphate polymeric lubricant is formed having the structure shown below by the reaction sequence depicted as follows:

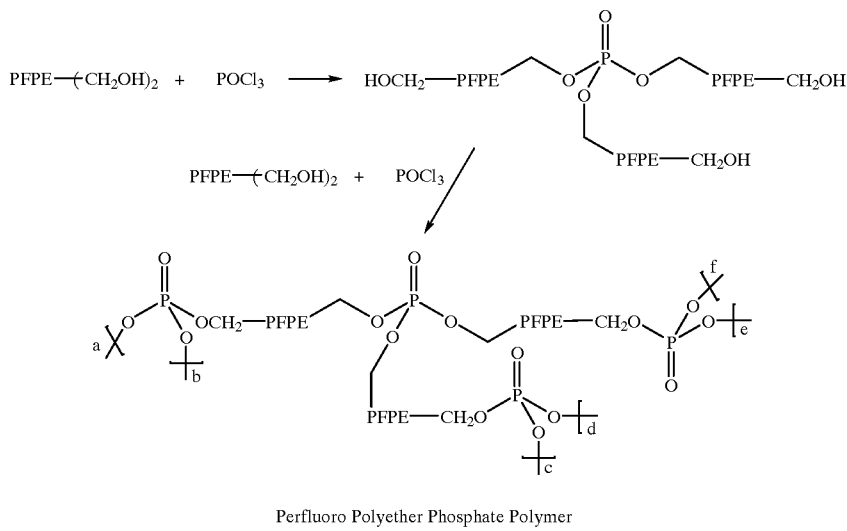

Perfluoro Polyether Phosphate Polymer wherein PFPE—{CH$_2$OH}$_2$ is a perfluoro polyether diol, POCl$_3$ is phosphorus oxychloride and a–f are integers from about 0 to about 10.

This invention also advantageously provides a series of lubricants which enables control of the bonded lube ratio in excess of 0.4, even in excess of 0.9, by adjusting the synthetic reaction chemistry. By adjusting the reaction time, reaction temperature, and the reaction reactant ratio, the ratio of PFPE alcohol and phosphorus oxychloride, the bonded lube ratio of the magnetic medium prepared from the resultant series of lubricants can be controlled from about 0.4 in excess of 0.9. Advantageously, the lubricants of the present invention are soluble in conventional solvents, such as organic solvents, e.g., Freon® and perfluorohexane. The lubricants of the present invention can be applied to a magnetic recording medium in any convenient manner, as by dip coating the medium in a solution of the lubricant in a conventional organic solvent.

Figure 6:
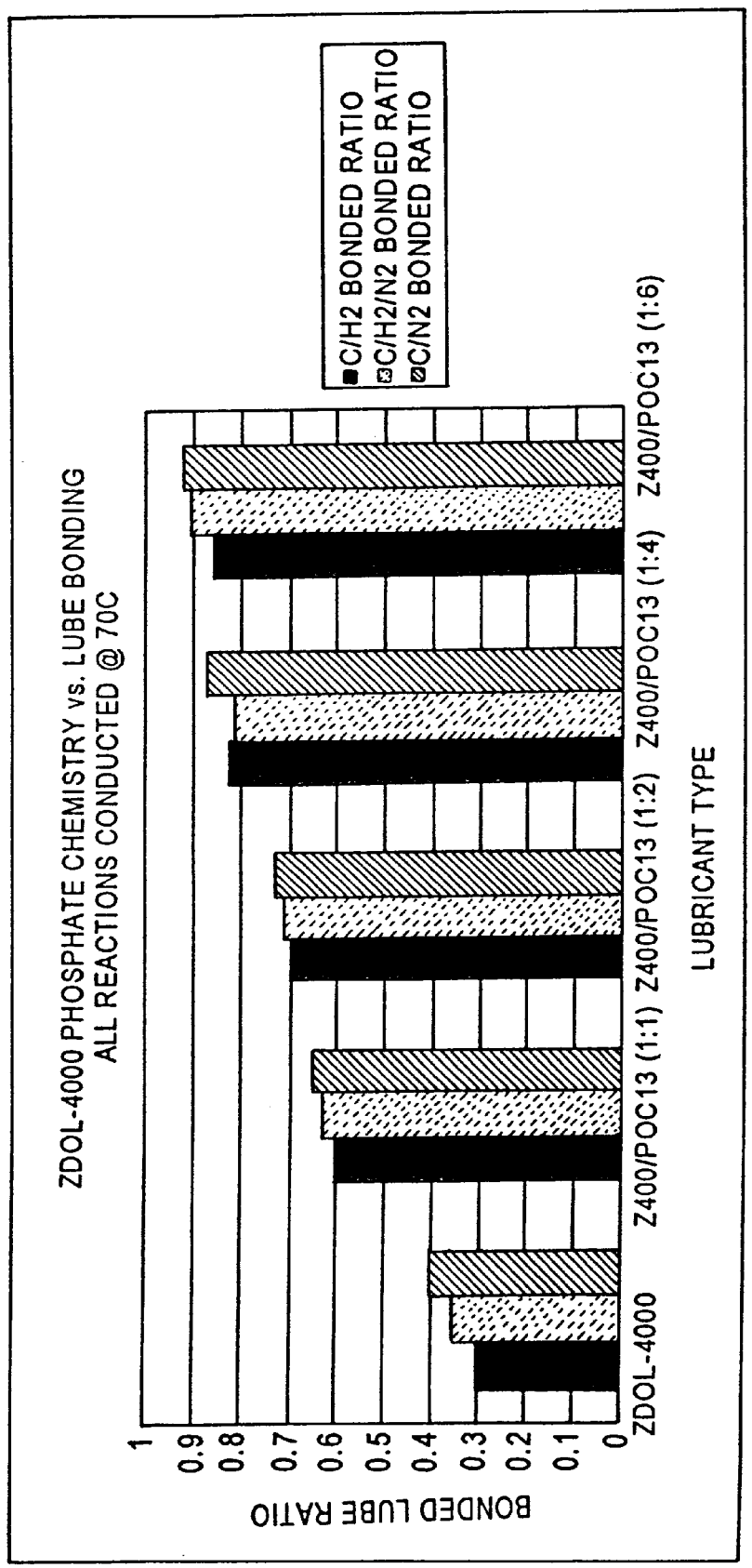
FIG. 6 is a graph displaying the bonded lube ratios for ZDOL-4000, Z4000/POCl$_3$ (1:1), Z4000/POCl$_3$ (1:2), Z4000/POCl$_3$ (1:4) and 2400/POCl$_3$ (1:6).
Figure 7:
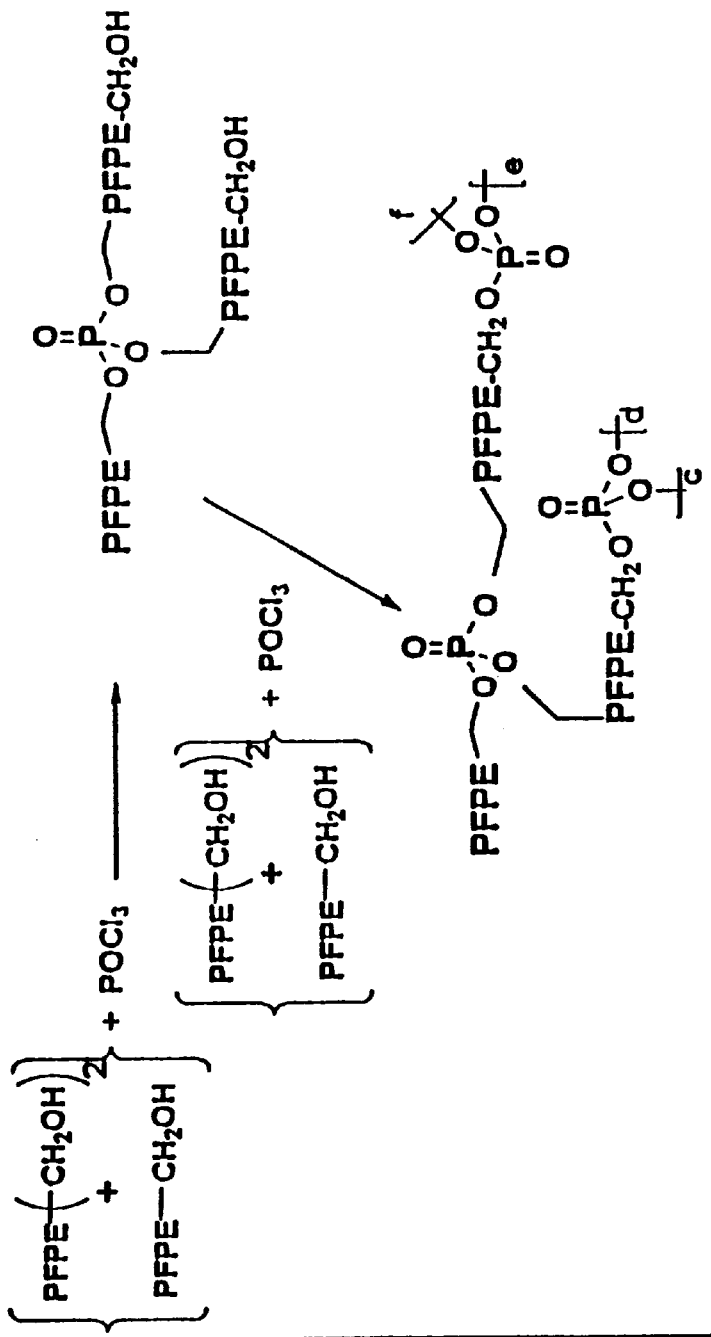
FIG. 7 is a representation of the reactions taking place in forming a perfluoro polyether phosphate polymer from a mixture of PFPE diols and PFPE alcohol, wherein the letters c–f are integers from about 0 to about 10.

The lubricants employed in the present invention are perfluorinated polyether phosphates, and the synthetic reaction chemistry is adjusted to control the extent of ultimate direct lubricant bonding to the magnetic recording medium. One having ordinary skill in the art, given the objective of the present invention, could easily determine the optimum synthetic reaction chemistry, after being apprised that it is a result-effective variable affecting the degree of bonding directly. In accordance with the present invention, it has been found that, as the PFPE diol/POCl$_3$ ratio decreases and the reaction temperature and time increase, the degree of direct bonding of the polyether phosphate polymer to a substrate, such as a protective carbon overcoat, increases. For example, it has been found that a phosphate polymer prepared from ZDOL-4000 and POCl$_3$ reacted in a ratio of 1/6 (moles/moles) at a reaction temperature of about 70° C. for about 30 hours provides a high degree of bonding, such as a bonded lube ratio in excess of 0.9. Compare FIG. 6.

In an embodiment of the present invention, conventional perfluoro polyether alcohol compounds, such as ZDOL, can be reacted with phosphorus oxychloride, for example, to prepare the inventive lubricants. ZDOL (Ausimont USA, Thorofare, N.J.) is a linear perfluoro polyether diol compound having the structure:

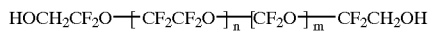

wherein m and n independently are 0 or an integer of up to 100.

ZDOL is available in various molecular weights ranging from over about 100 to about 10,000 prepared from commercial sources by fractionation, any of which may be employed to synthesize the lubricants employed in the practice of the present invention.

It should be apparent to one having ordinary skill in the subject art that any perfluoro polyether alcohol can be employed to prepare the corresponding phosphate polymer used in the practice of the present invention. Indeed, the PFPE employed in the present invention can be of any type, including PFPE-1, PFPE-2, PFPE-3 and PFPE 4 (Del Pesco, Perfluoroalkylpolyethers, CRC Handbook of Lubrication and Tribology, Vol. III, pp. 287–303, 1994, Booser, E. R. ed. CRC Press, Boca Raton, Fl.).

Another commercially available perfluoro polyether alcohol compound which can be employed to synthesize a phosphate lubricant useful in the present invention is Demnum SA (Nagase & Co., Ltd.) which has the following structure:

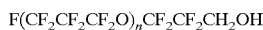

wherein n is an integer of about 15 to about 100.

Demnum SA is available in molecular weights ranging from about 1500 to about 8000, and with fractionation techniques, such as flash chromatography or distillation, molecular weights of about 200 to about 10,000 can be obtained. In another embodiment of the present invention, Demnum SA having an average molecular weight from about 1000 to about 5000, such as 2000, can be employed.

The lubricant topcoat of the present invention can be applied to a magnetic recording medium, either on the magnetic layer or on a conventionally applied protective overcoat, particularly a carbon overcoat. In an embodiment of the present invention, the lubricant is dissolved in a conventional organic solvent, such as Freon® or perfluorohexane, in a ratio of about 0.0001% to about 100% by (weight/weight), preferably about 0.001% to about 0.5%. A typical magnetic recording medium, for example, a composite comprising a non-magnetic substrate having sequentially deposited on each side thereof an underlayer, a magnetic layer, and a protective carbon overcoat, is submerged in the lubricant solution and then slowly withdrawn therefrom. In practicing the present invention, one can employ a conventional lifter-type dipper to submerge the composite in the lubricant solution.

One having ordinary skill in the art can easily optimize the duration of submergence and the speed of withdrawal to achieve a desired coating thickness. Surprisingly, it was found that the lubricants of the present invention, particularly those prepared from PFPE alcohols having a molecular weight between about 1000 and 5000, can form lubricant topcoats with bonded lube ratios in excess of 0.9, at various thicknesses such as about 8 Å to about 25 Å.

The lubricants of the present invention characteristically form a uniformly bonded topcoat at an extremely high bonded lube ratio. In view of such a high bonded lube ratio, under certain circumstances it is advantageous to apply an optional thin mobile lube layer, e.g., about 1 Å to about 15 Å, to the bonded lubricant topcoat to further enhance stiction and wear performance. Magnetic recording media produced in accordance with the present invention exhibit low static friction and increased durability during CSS testing.

EXAMPLES

In a vial were mixed ZDOL-4000 (5 g: 0.31 mm) and phosphorus oxychloride (0.05 ml; 0.53 mm) with vigorous stirring. After about 5 hours the mixture was heated to about 70° C. and stirred for about 72 hours, after which more phosphorus oxychloride (0.2 ml; 2.1 mm) was added and the mixture stirred for about an additional 24 hours at about 70° C. The mixture was then cooled and chromatographed over SiO$_2$. Elution with Freon TF® provided 0.3 g of an off-white semi-solid. Further elution with Freon TA® yielded 3.3 g (66%) of a clear oil. The reaction occurring is set forth below.

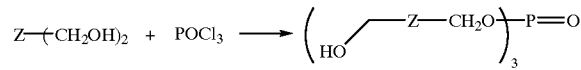

Figure 2:
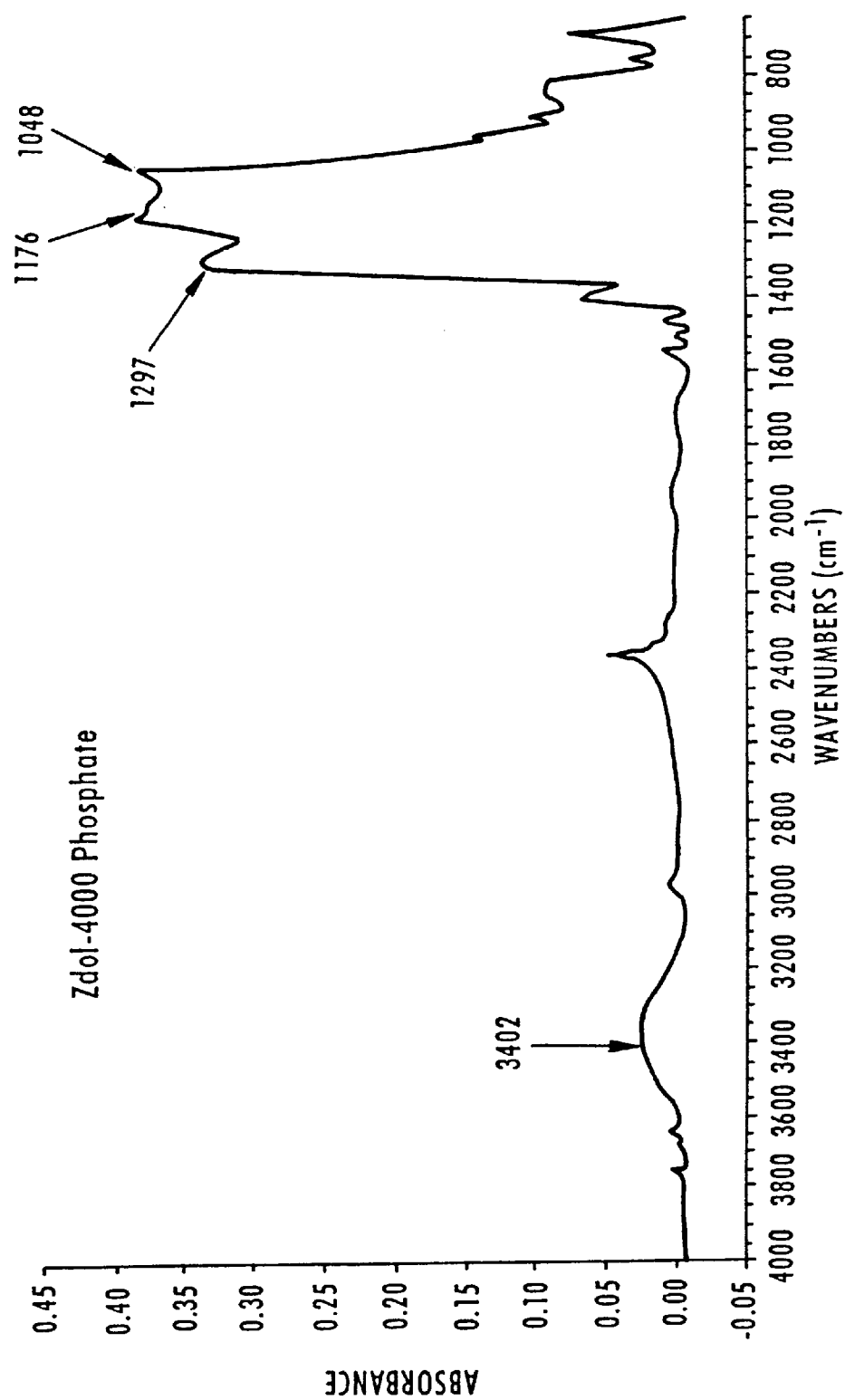
FIG. 2 represents the Fourier transform-infrared (FT-IR) spectrum of a phosphate polymer of the present invention.
Figure 3:
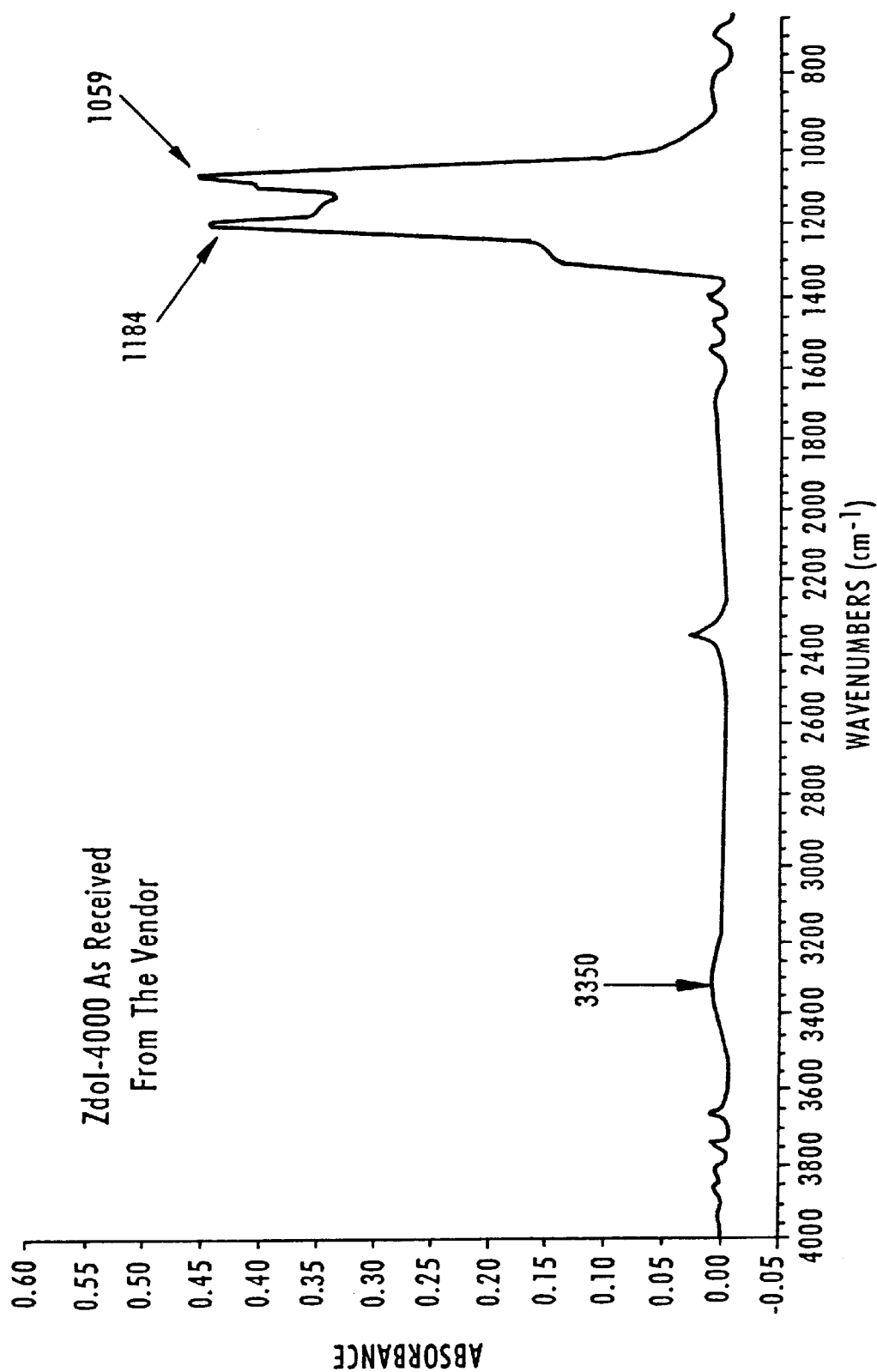
FIG. 3 represents the FT-IR spectrum of ZDOL-4000, a commercial polyether alcohol.

The FT-IR spectrum of the resulting phosphate polymer is set forth in FIG. 2 and indicates both phosphate at 1292 cm$^{-1}$ and carbon fluorine was about 1200–1000 cm$^{-1}$. For comparison, the FT-IR spectrum of ZDOL-4000 is shown in FIG. 3.

Figure 4:
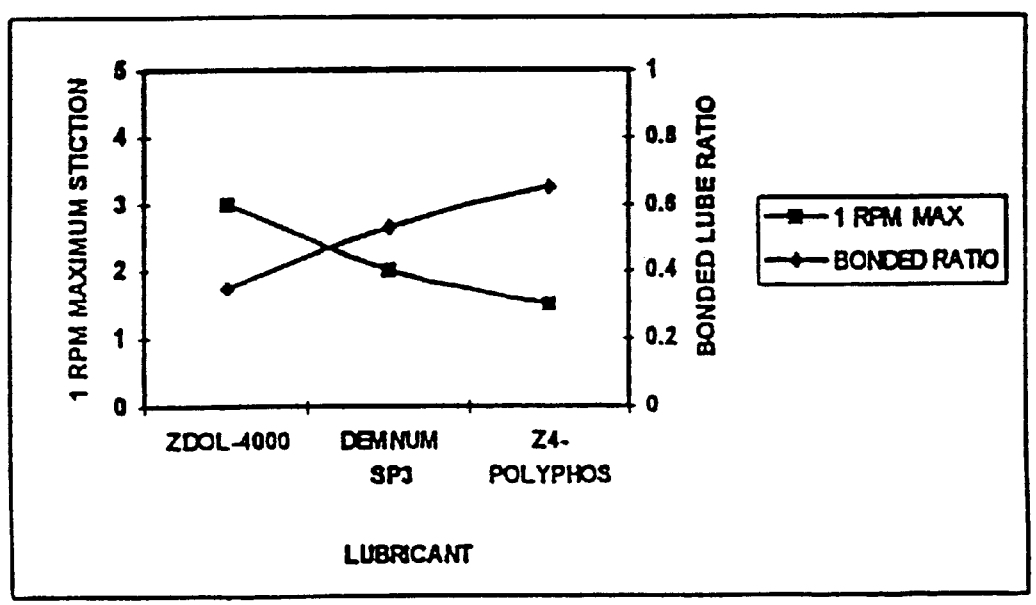
FIG. 4 is a graph depicting the results of testing comparing the effectiveness of a lubricant topcoat of the present invention with that of conventional lubricants.
Figure 5:
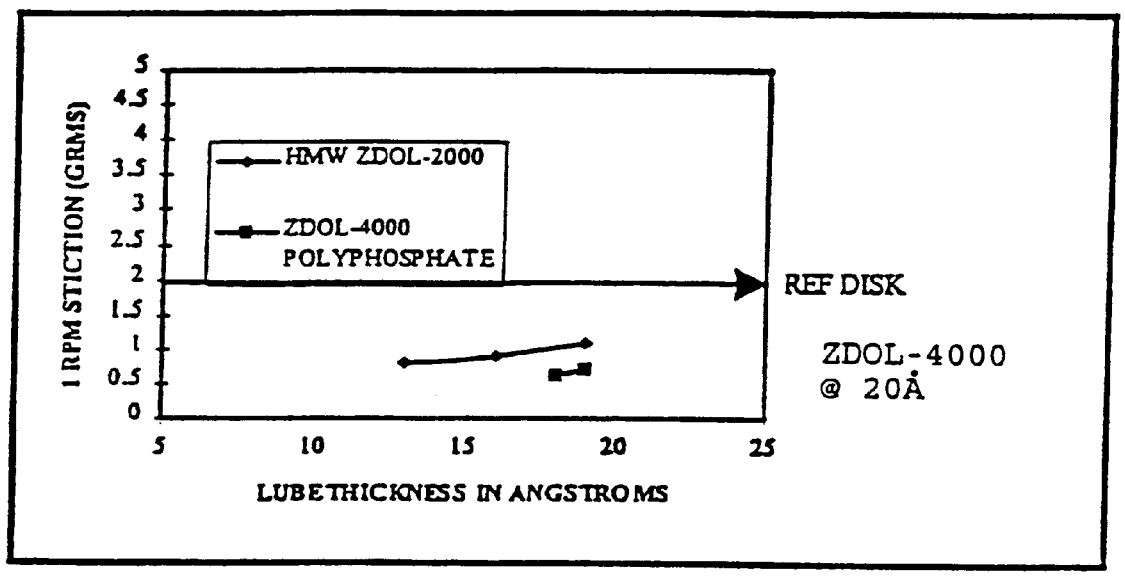
FIG. 5 is a graph showing results of comparing the effectiveness of a lubricant topcoat of the present invention with that of a conventional lubricant.

The phosphate polymer of ZDOL-4000 lubricant of the present invention was subjected to comparison testing vis-à-vis ZDOL-4000 and Demnum SP3, which are commercially available lubricants conventionally employed to form lubricant topcoats for magnetic recording media. In each case, a magnetic recording medium was prepared of identical structure, i.e., substrate, underlayer, magnetic layer and protective carbon overcoat, except for the difference in lubricant topcoat. The results depicted in FIG. 4 demonstrate that the phosphate polymeric lubricant of the present invention exhibits a superior bonded lube ratio and superior stiction performance vis-à-vis each of ZDOL-4000 and Demnum SP3.

In another comparison, the phosphate polymer of ZDOL-4000 lubricant produced in accordance with the present invention was tested against HMW ZDOL-2000, another lubricant conventionally employed to form lubricant topcoats. As in the previous comparison, magnetic recording media of identical structure, except for the lubricant topcoat, were compared. The magnetic recording media according to the present invention had a lubricant topcoat thickness of 18 Å and 19 Å; while the comparison media had a ZDOL-2000 topcoat thickness of 13 Å, 16 Å and 19 Å. The results depicted in FIG. 4 demonstrate that the lubricant topcoat of the present invention exhibits superior stiction performance vis-à-vis the conventional ZDOL-2000 lubricant.

The lubricant topcoats of the present invention advantageously achieve high bonded lube ratios and exhibit superior stiction performance. The present invention is not limited to any particular type of lubricant, in that the concept of forming a phosphate polymer with a controlled reaction chemistry to optimize the degree of direct lubricant bonding is applicable to a wide variety of polymers.

Figure 1:
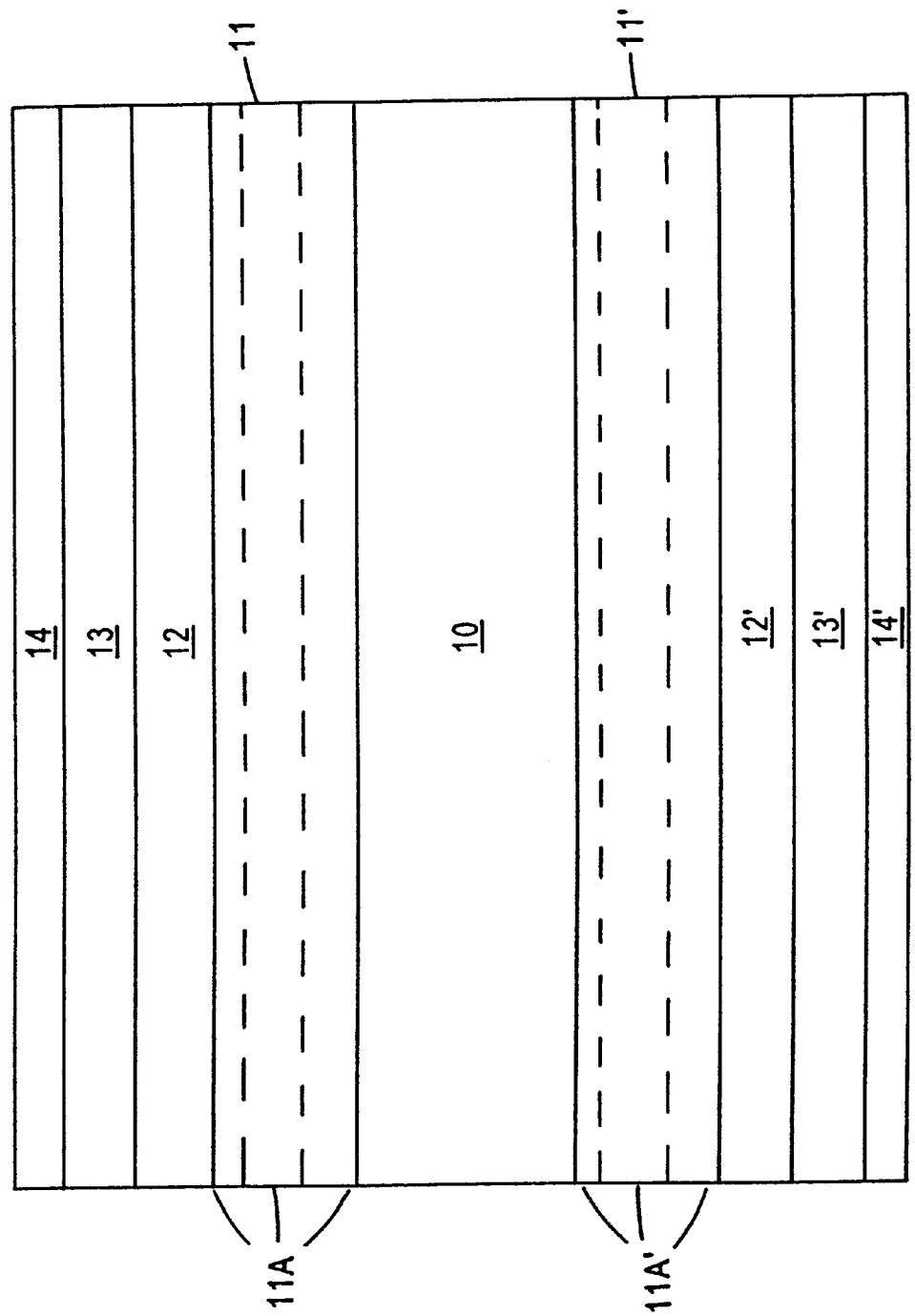
FIG. 1 schematically depicts a magnetic recording medium structure to which the present invention is applicable.

The present invention is not limited to any particular type of magnetic recording medium, but can be employed to provide a lubricant topcoat on any of various types of magnetic recording media, including those wherein the substrate or a subsequently deposited layer has been textured, as by mechanical treatment or laser techniques, and the textured surface substantially reproduced on subsequently deposited layers. Thus, a lubricant topcoat of the present invention can be applied as topcoat 14 on the magnetic recording medium depicted in FIG. 1, but is not necessarily limited thereto. only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A phosphate polymer having the following formula:

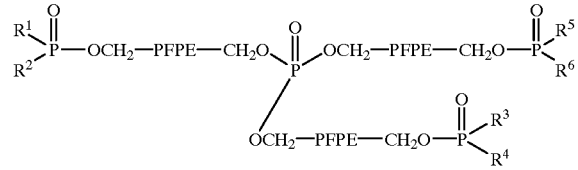

wherein $R^1$, $R^2$, $R^3$, $R^4$, $R^5$ and $R^6$ are independently a fluoroalkylether-phosphate group, a fluoroalkylether group, an OH group, or a fluoroalkylether phosphate repeating unit of up to 10 repeating units; and PFPE is a perfluoroalkylether group.

2. The phosphate polymer of claim 1, wherein the PFPE represents the formula:

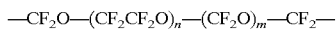

wherein each of m and n is 0 or an integer of up to about 100.

3. The phosphate polymer of claim 1 having a molecular weight of about 1000 to about 50,000.

4. A solution containing the phosphate polymer of claim 1 and an organic solvent.

5. The solution of claim 4, wherein the solvent is perfluorohexane.

6. A method of producing the phosphate polymer of claim 1, which method comprises combining a fluoro polyether alcohol compound with phosphorus oxychloride.

7. The phosphate polymer of claim 1, wherein at least one of $R^1$ through $R^6$ is a fluoroalkylether phosphate group.

* * * * *